Figure 1:
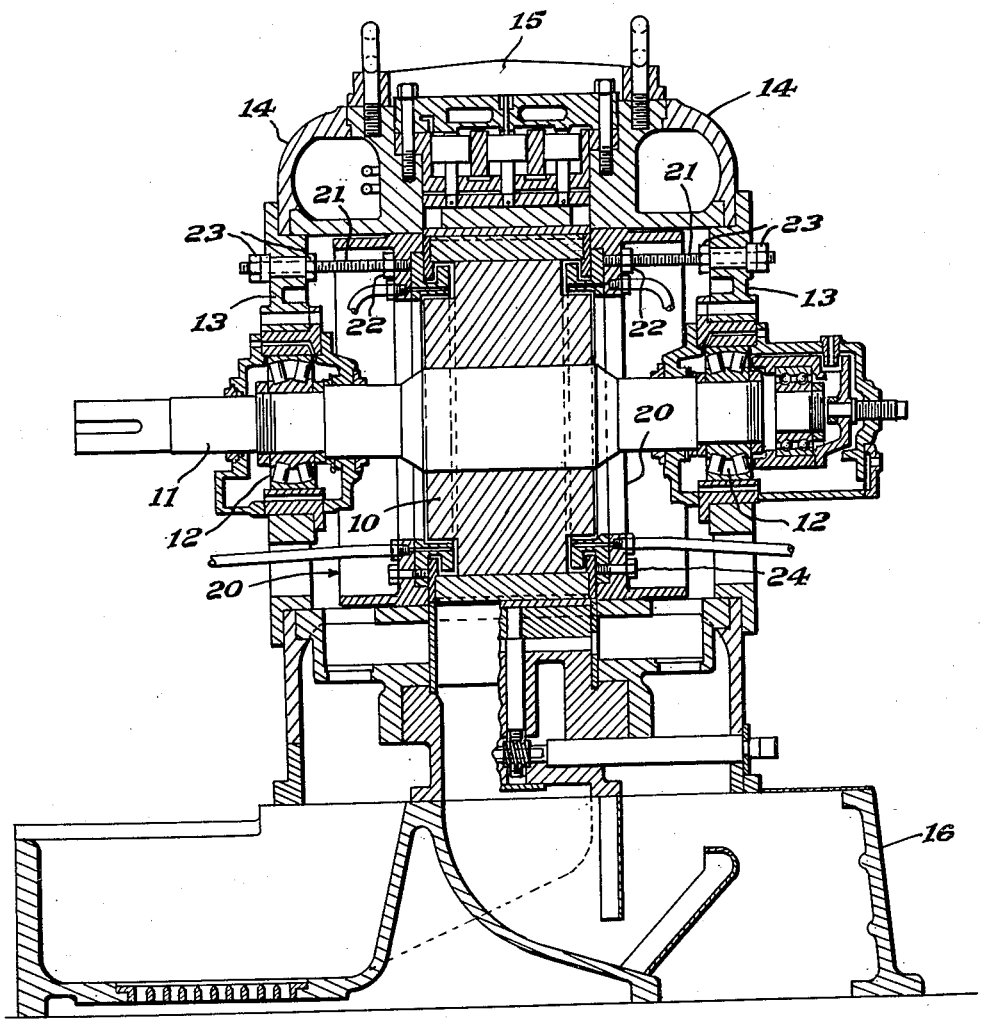

Dec. 5, 1950  C. E. ROBERSON  2,533,199
HYDRAULIC SEAL FOR PULP REFINING MILLS
Filed Jan. 9, 1947  2 Sheets-Sheet 1

INVENTOR.
CYRUS E. ROBERSON
BY
Geo B Rawlings
ATTORNEY

Dec. 5, 1950     C. E. ROBERSON     2,533,199
HYDRAULIC SEAL FOR PULP REFINING MILLS

Filed Jan. 9, 1947     2 Sheets-Sheet 2

INVENTOR.
Cyrus E. Roberson
BY
Geo B Rawlings
ATTORNEY

Patented Dec. 5, 1950

2,533,199

UNITED STATES PATENT OFFICE 2,533,199

HYDRAULIC SEAL FOR PULP REFINING MILLS

Cyrus E. Roberson, Hoosick Falls, N. Y., assignor to The Noble & Wood Machine Company, Hoosick Falls, N. Y., a corporation of New York Application January 9, 1947, Serial No. 721,116

2 Claims. (Cl. 286—9)

The present invention relates to improvements in apparatus for stuff treatment wherein the material to be treated is passed in fluid form or in a fluid medium through a treatment zone and there subjected to suitable forces for producing the desired change of condition.

Such a type of apparatus is shown, described and claimed in the patent granted to Charles P. Tolman under No. 2,087,560, dated July 20, 1937.

The principal object of present invention is an improved sealing structure interposed between the rotor element of the apparatus and the stator or stationary element, or side frame, for preventing leakage of stock at this point.

In the apparatus of the Patent No. 2,087,560, and on which the present invention is an improvement, the sealing ring or rings, carried by the stationary element or side frame was set up against the side walls of the rotor, adjacent the periphery thereof by means of spring-loaded bolts to a running fit with the rotor. These bolts were very difficult to adjust, and yet, if not accurately adjusted, as for example, if too tight, the heat generated by the rotation of the rotor would warp the ring to the extent that the horse power requirements of the apparatus increased abnormally. If too loosely adjusted the sealing ring would not perform, or performed indifferently, its sealing function.

In my present invention, I have devised a new and novel construction wherein the sealing medium is a fluid, such as oil or water and in which the sealing is accomplished by an initial pressure exerted on the fluid, supplemented by the pressure generated by centrifugal force produced by the rotation of the rotor. In the invention no running parts are in contact. In carrying out the invention, an annular groove is constructed in each side face of the rotor, and fitting in such annular groove, but out of contact therewith at any point, is annular grooved member carried by the stationary side frames. Means is provided for feeding into said annular grooves liquid, such as oil or water, under pressure, such as approximately ten pounds per square inch. This pressure, supplemented by the additional pressure produced by the centrifugal force generated by the rotation of the rotor, is ample to maintain a fluid tight joint between the rotor and side frames, and prevent leakage of the stuff being worked upon. Further, accurate adjustment of the side frames or the parts carried thereby, is unnecessary, as no metal parts are ever in actual contact with each other.

The object of the invention therefore, is an improved sealing means for the rotors of stuff treating apparatus.

Figure 2:
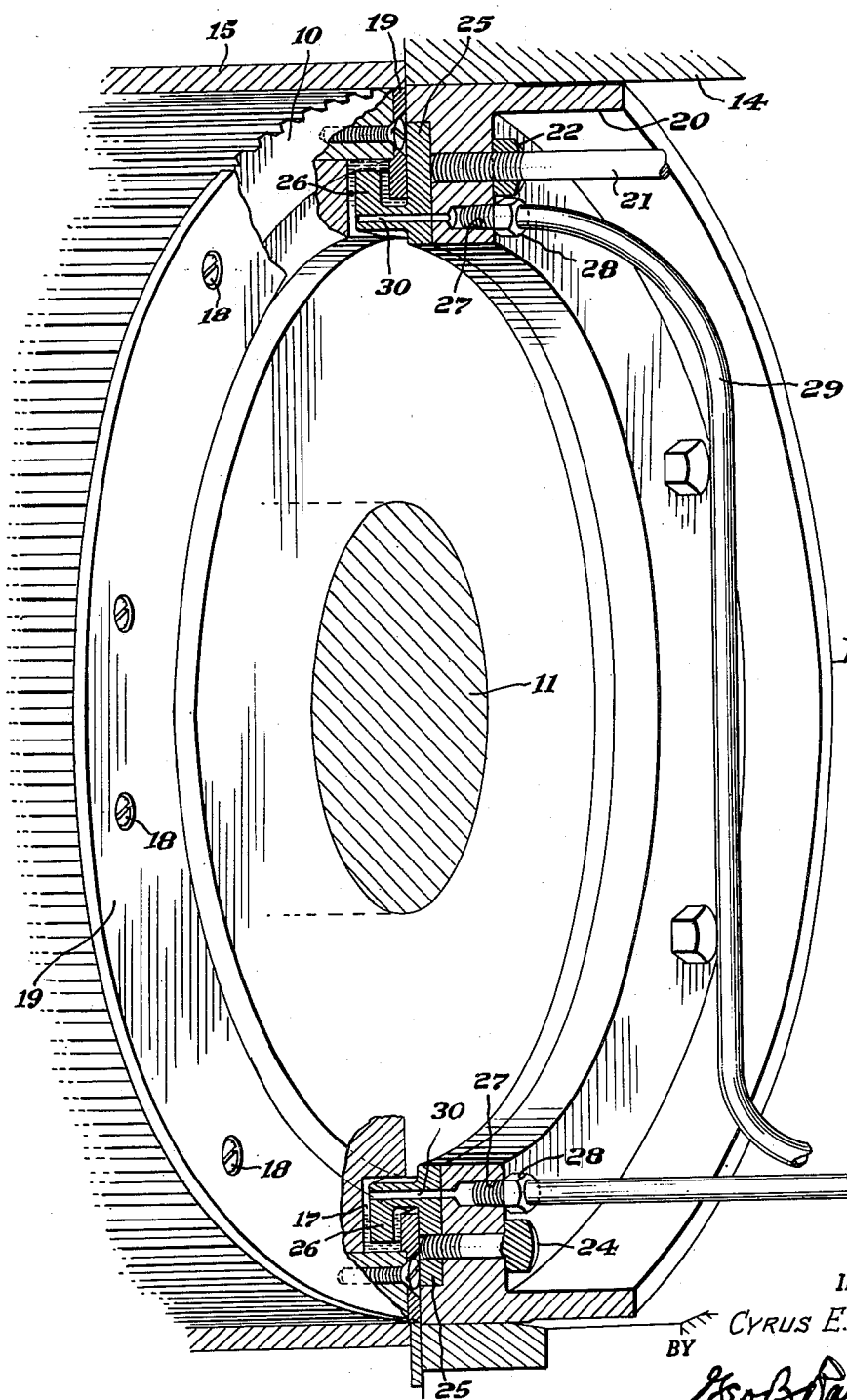

In the accompanying drawings illustrating a preferred embodiment of the invention and its application to a stuff treating apparatus:

Fig. 1 is a vertical sectional side elevation through a stuff treating machine having the present invention incorporated therein, and Fig. 2 is a perspective view of a portion of the apparatus illustrated in Fig. 1, and showing in detail, the present invention.

Referring to the drawings, there is shown a rotor 10 mounted on a shaft 11, mounted for rotation in bearings 12 carried by spiders 13, said shaft 11 being driven from any suitable source of power, as for example, a motor, not shown. The spiders 13 are mounted, one on each side of frame members 14, and the frame members 14 are in turn, mounted on the sides or ends of a central spacing member 15. The structural elements above referred to are mounted on a base 16. The various elements comprising the apparatus, while important, are not germane to the present invention, and will not be further referred to, except incidentally.

In the drawings, there is shown in Fig. 1 in section, and in Fig. 2, in perspective, the particular structure forming the subject matter of the present invention. Referring to the drawings, and more particularly to Fig. 2, it will be noted that the end face of the rotor 10, adjacent to the periphery of the rotor and concentric therewith, is provided with a rectangular (in section) groove 17 and secured to such end face of the rotor 10, by screws 18, is an annular plate 19, of an outer diameter substantially equal to the outer diameter of the rotor 10, and of an internal diameter less than the outer diameter of the rectangular groove 17. This structure persists on each end of the rotor 10, as may be seen in Fig. 1. There is thus formed on each end or face of the rotor 10, a groove which viewed in section, is re-entrant in character, and which, if the rotor 10 were rotated and a liquid, such as oil or water, were fed into said groove 17, would tend, through the centrifugal force generated by the rotor 10, to cause the liquid to move radially outward, or into the position shown clearly in Fig. 2.

On each side of the rotor 10, and slidably mounted in the frame members 14 are the members 20. Spaced about the face of the members 20, and but one of which is shown, are adjusting rods 21, both ends of which are threaded, as shown. One end is threaded into the member 20 and held in position by the lock nut 22, and the other end is also threaded and passes through a hole in the spider 13, and is held locked in adjusted position by the lock nuts 23.

On the inner face of the members 20 and secured thereto by bolts 24, is an annular plate 25, and formed integral therewith and on the inner face thereof, is an inwardly and then outwardly extending circular member 26. The width of the member 26 is less than the width of the space between the inner diameter of the rectangular groove 17 and also the outwardly extending portion is less in width than the depth of the groove 17 back of the annular plate 25. There is thus formed a tortuous path (in section) as viewed in Fig. 2 for clearness, which forms a reservoir in which the liquid, as oil or water, will collect to form a sealing medium for the rotor 10.

Under ordinary conditions, the centrifugal force developed by the rotor 10 is approximately ten pounds per square inch, which is ample to maintain a seal at the edge of the rotor 10. To insure a sufficient supply of liquid to replace that lost by evaporation, or leakage, the members 20, at one or more points, is drilled and tapped at 27 to receive coupling members 28 to which are attached feed pipes 29 leading to any suitable source of supply of liquid under pressure. In alignment with the tapped holes 27, the members 20 and 25 are drilled, as at 30 to conduct liquid fed through the pipes 29 to rectangular groove 17. The liquid, such as oil or water, is fed through a pressure valve (not shown) set at a pressure—say twelve pounds water pressure—but in any case not less than the hydrostatic head (approximately ten pounds) developed by the centrifugal force of the rotating rotor 10. Only a relatively small amount of liquid need be fed in order to maintain in the reservoir 17 sufficient liquid to lubricate the rotor.

There is thus obviated the necessity of closely adjusting the sealing parts of the device: no metal parts are in rubbing relation during the operation of the apparatus; and leakage of the stuff being worked upon, is prevented.

Having thus described the invention, what is claimed as new is:

1. In stuff treating apparatus having a stator and a rotor and in which the rotor is provided in its end face with an annular groove to contain a sealing fluid, an annular plate fixed to the end face of the rotor with its inner end projecting into said groove and spaced from the bottom of the groove, an annular adjusting plate slidably mounted upon the stator for adjustment in an axial direction relative to said first-named plate and having in its end face a recess, a U-shaped sealing ring one leg of which is mounted within said recess in juxtaposition to said first-named plate and the other leg of which extends inwardly beneath the inner end of said first-named plate in spaced relation thereto and thence extends upwardly into said groove, said last-named leg being of less area than said groove and being spaced from the groove walls and from said first-named plate to provide a tortuous path for sealing fluid contained in said groove when the same is forced outwardly towards said first-named plate and towards the first-named leg of said sealing ring by the centrifugal force developed by the rotor when in operation, and means for introducing a sealing fluid into said groove as required.

2. The apparatus of claim 1, and axially extending rods connected at one end to the stator and at the other end to the said adjustable plate for adjusting said adjustable plate relative to said first-named plate.

CYRUS E. ROBERSON.

REFERENCES CITED

The following references are of record in the file of this patent:

UNITED STATES PATENTS

| Number | Name | Date |
|---|---|---|
| 1,070,809 | Hodgkinson | Aug. 19, 1913 |
| 1,949,429 | McGee | Mar. 6, 1934 |
| 2,087,558 | Tolman | July 20, 1937 |
| 2,241,970 | Thompson | May 13, 1941 |